US010857694B2

(12) United States Patent
Chen-Iun-Tai

(10) Patent No.: US 10,857,694 B2
(45) Date of Patent: Dec. 8, 2020

(54) 3-D PRINTER ON ACTIVE FRAMEWORK

(71) Applicant: APIS COR ENGINEERING, LLC, Owings Mills, MD (US)

(72) Inventor: Nikita Chen-Iun-Tai, Irkutsk (RU)

(73) Assignee: APIS COR ENGINEERING, LLC, Owings Mills, MD (US)

( * ) Notice: Subject to any disclaimer, the term of this patent is extended or adjusted under 35 U.S.C. 154(b) by 229 days.

(21) Appl. No.: 15/811,837

(22) Filed: Nov. 14, 2017

(65) Prior Publication Data

US 2018/0066441 A1 Mar. 8, 2018

Related U.S. Application Data

(63) Continuation-in-part of application No. 15/170,235, filed on Jun. 1, 2016, now abandoned.

(Continued)

(51) Int. Cl.
*B28B 1/00* (2006.01)
*E04G 11/24* (2006.01)
(Continued)

(52) U.S. Cl.
CPC .............. *B28B 1/001* (2013.01); *B28B 15/00* (2013.01); *B28B 17/0063* (2013.01);
(Continued)

(58) Field of Classification Search
CPC ....... B28B 1/001; B28B 15/00; B28B 15/002; B33Y 10/00; B33Y 30/00; B33Y 40/00; B33Y 50/00; B33Y 50/02; B33Y 99/00; E04G 11/22; E04G 21/00; E04G 21/02; E04G 21/04; E04G 21/0427; E04G 21/0436; E04G 21/0445; E04G 21/0463; E04G 21/0481; B29C 64/10; B29C 64/20;
(Continued)

(56) References Cited

U.S. PATENT DOCUMENTS 3,552,747 A * 1/1971 Deem .................... A63G 27/00
 472/3
4,374,790 A * 2/1983 McGowan .......... E04G 21/0427
 264/310
2007/0028532 A1* 2/2007 Douglas ................ E04H 12/182
 52/118

FOREIGN PATENT DOCUMENTS

GB 2510598 A * 8/2014 ............. B33Y 30/00

* cited by examiner

Primary Examiner — Robert C Dye
Assistant Examiner — Sedef E Paquette
(74) Attorney, Agent, or Firm — Nadya Reingand; Yan Hankin

(57) ABSTRACT

A 3D printer with a lift mechanism is disclosed. The 3D printer is coupled to the lift mechanism which is in turn coupled to a base or the ground. The lift mechanism comprises telescopically extendable columns comprising concentric cylinders positioned within one another, so as to extend and collapse fully, thus raising and lowering the 3D printer to a specific height. The lift mechanism further comprises extendable and lockable diagonals which connect neighboring telescopic columns at their top portions in a helical fashion. The diagonals are installed for sturdiness and support as the lift is operated, as well as to position the lift at a desired height when the diagonals are locked in place. The lift mechanism may comprise 2 telescopic cylinder columns or 3 or more telescopic cylinder columns. The lift mechanism comprises at least a first stage and an intermediate stage, and optionally a last stage.

9 Claims, 15 Drawing Sheets

Related U.S. Application Data

(60) Provisional application No. 62/425,952, filed on Nov. 23, 2016, provisional application No. 62/173,523, filed on Jun. 10, 2015.

(51) Int. Cl.

| | |
|---|---|
| *B66C 23/70* | (2006.01) |
| *B28B 17/00* | (2006.01) |
| *B33Y 10/00* | (2015.01) |
| *B33Y 50/02* | (2015.01) |
| *B33Y 40/00* | (2020.01) |
| *B33Y 30/00* | (2015.01) |
| *B66C 1/10* | (2006.01) |
| *E04G 21/04* | (2006.01) |
| *B28B 15/00* | (2006.01) |

(52) U.S. Cl.
CPC ............... *B33Y 10/00* (2014.12); *B33Y 30/00* (2014.12); *B33Y 40/00* (2014.12); *B33Y 50/02* (2014.12); *B66C 1/10* (2013.01); *B66C 23/702* (2013.01); *E04G 11/24* (2013.01); *E04G 21/0427* (2013.01); *E04G 21/0463* (2013.01)

(58) Field of Classification Search
CPC ... B29C 64/232; B29C 64/236; B29C 64/241; B29C 64/30; E02D 2250/0015; E02D 2300/0018; E02D 2300/002; E04B 1/16; B25J 9/02; B25J 19/002; E04H 12/18; E04H 12/182; E04H 12/34; F15B 15/16; F05B 2240/9151
USPC .......................................................... 264/31
See application file for complete search history.

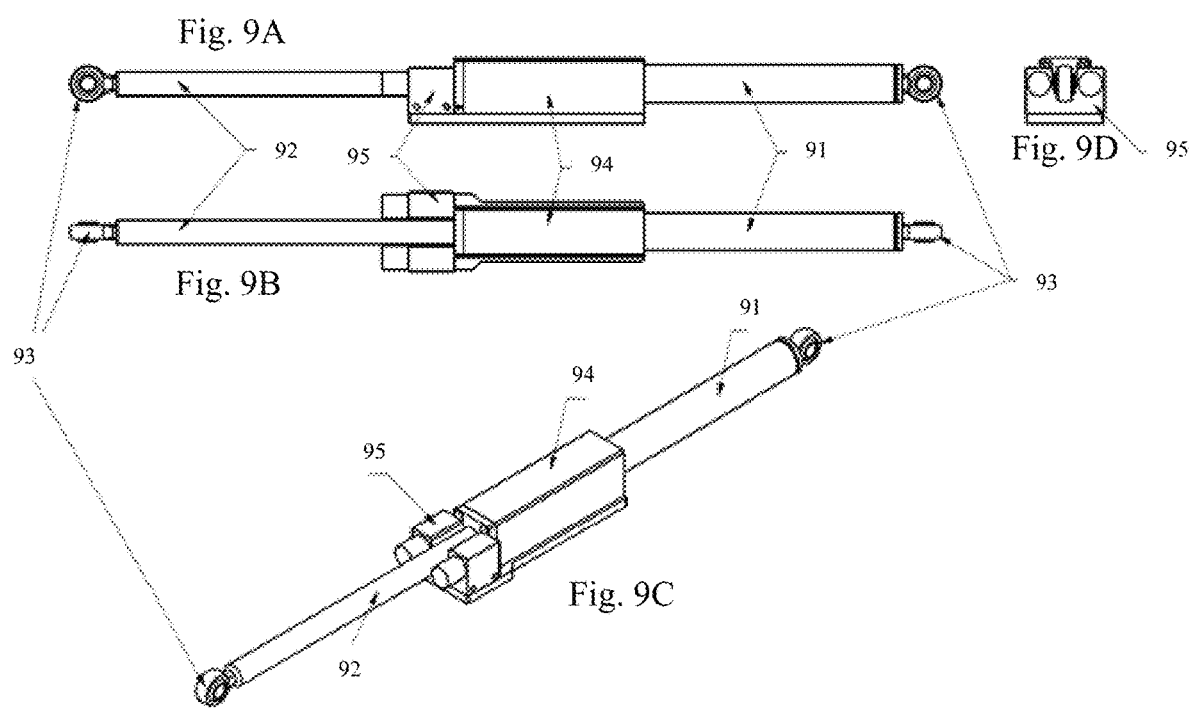

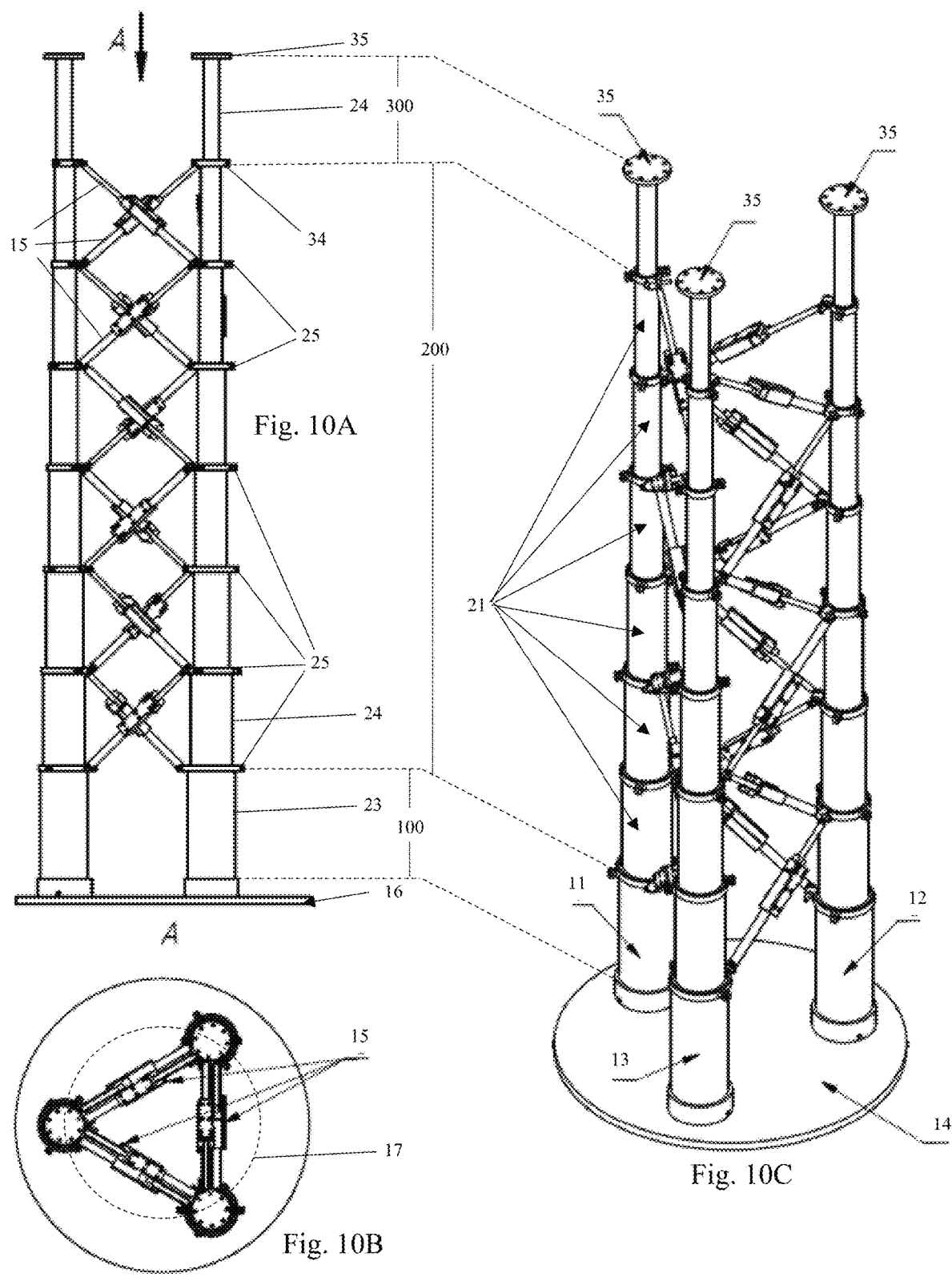

3-D PRINTER ON ACTIVE FRAMEWORK

CROSS-REFERENCE TO RELATED APPLICATIONS

This patent application claims priority to, and incorporates fully by reference, U.S. Provisional Patent Application No. 62/425,952, titled "3-D printing platform, clamp device and active framework," filed Nov. 23, 2016, and it is also a Continuation-in-Part of U.S. patent application Ser. No. 15/170,235, titled "3-D Printer in Polar Coordinates," filed Jun. 1, 2016, which claims priority to U.S. Provisional Patent Application No. 62/173,523, filed Jun. 10, 2015.

FIELD OF THE INVENTION

The present invention is in the field of building construction. Particularly, the invention concerns a system and structure for automated three-dimensional construction of buildings and structures using a concrete-based chemical solution.

BACKGROUND OF THE INVENTION

Application CN 103,786,235 A, by Liao Xuan Mao et al., discloses a tower-type 3D printer with a tower crane, a material adding system, a control system, a maneuvering system, a material guide pipe, and a printing system. The disclosed invention relies on a catheter, laser, and temperature control head. The disclosed invention is for making small parts that can be organized into large entities. The use of a concrete-based chemical solution is not disclosed.

Application US 2014/0,252,668, by Austin et al., discloses an apparatus for performing a multi-layer construction method using cementitious material having a reservoir for containing cementitious material; the reservoir is coupled to a print head with a delivery nozzle; the delivery nozzle can be moved by a robotic arm assembly to index the nozzle along a predetermined path; flow of the cementitious material from the reservoir to the nozzle and to extrude the material out of the nozzle is controlled in conjunction with indexing of the nozzle; a support material, an accelerating agent and a cartilage material may also be deposited from the print head. The application does not disclose using one supporting pole for up and down motion, to which a telescoping mechanism is attached. The arm moves in one plane parallel to the ground.

Application EP 2,610,417, by Khoshnevis, discloses an apparatus for automated construction with an extrusion nozzle and a robotic arm. The apparatus has a nozzle assembly configured to extrude material through an outlet and a controllable robotic arm coupled to the nozzle assembly, the robotic arm having at one end a gripper configured to pick up an element and deposit the element at a desired position relative to the extruded material. The application does not disclose using one supporting pole for up and down motion, to which a telescoping mechanism is attached. The arm moves in one plane parallel to the ground.

Patent CN 204136193, by Zhang Yuan Ming et al., discloses a print-based concrete plaster mold ceramic slurry of solid freeform fabrication machine. The printer includes a printing apparatus line of the mold, filling the slurry feed printing apparatus and a multi-degrees of freedom robot arm movement mechanism. Also disclosed are line printing means for printing the mold body and the mold support portion. The slurry feed filling apparatus comprises an ultrasonic slurry nozzle rapping, vacuum filter for the slurry, the slurry bypass device, and a slurry pressure pump and agitator. After the slurry is uniformly stirred and excess water and gas is removed, at a controlled flow rate and pressure of the incoming ultrasonic nozzle, rapping pier real slurry is filled. Print mold is performed layer by layer until the model outline and filling paste printing is complete, then the mold envelope is removed to obtain the desired components. The main solution to the complex structure of the solid slurry freeform problems is proposed as follows. A printer without mold, low cost, production speed, can be used to quickly customize various sculptures, statues, ceramic structural parts, as well as complex art structures. The patent does not disclose using one supporting pole for up and down motion, to which a telescoping mechanism is attached, and an arm which moves in one plane parallel to the ground using a cylindrical coordinate system.

Patent CN 204054670, by Wang Meihua et al., discloses a utility model providing a 3D printing device capable of realizing polar coordinate positioning for a building. A circular track beam is horizontally built on stilts by virtue of a plurality of supports, a printing head cross beam passes through the center of a circle of the circular track beam, both ends of the printing head cross beam are respectively in sliding connection with the circular track beam, the printing head cross beam can rotate in a plane on which the circular track beam is positioned around the center of the circle of the circular track beam, a printing head rod is mutually perpendicular to the circular track beam, one end of the printing head rod is in sliding connection with the printing head cross beam, a printing head is arranged on the other end of the printing head rod which can extend to drive the printing head to move up and down, and the printing head can linearly move along the printing head cross beam along with the printing head rod. By using the 3D printing device, the printing head can be positioned in a form of a polar coordinate system, and compared with a 3D printing device based on a rectangular coordinate system for a building, the 3D printing device has the advantage of high printing precision and efficiency. The patent does not disclose using one supporting pole for up and down motion, to which a telescoping mechanism is attached, and an arm which moves in one plane parallel to the ground using a cylindrical coordinate system.

SUMMARY OF THE INVENTION

The invention consists of an automated device for constructing buildings and structures by a method of three-dimensional printing using a concrete-based chemical solution and a controlling mechanism employing polar coordinates.

A telescopic lift mechanism with extendable diagonals is also disclosed for added structure and support of the 3D printer. The telescopic lift mechanism comprises at least 2 telescopic legs positioned linearly or along a closed curve, each leg having concentric columns with a top part and a bottom part. Each column's top part may be connected to a consecutive column top of a neighboring telescopic leg by an extendable and lockable diagonal, as shown, e.g., in FIGS. 10A-10C and 11A-11B. The telescopic legs are capable of full extension thus raising the 3D printer, which is located on the lift mechanism, to any desired height, and collapsing fully to bring the 3D printer back towards the ground. The diagonals are connected such that a full collapse and a full extension are always possible (e.g., such that no top along the same level of each telescopic leg is coupled to more than one diagonal). The diagonals are also capable of locking in place (and unlocking) for additional structure and sturdiness.

The present invention generally comprises a base having a top surface, a lift mechanism coupled to the base on the top surface, a 3D printer supported by the lift mechanism, the lift mechanism including a sequence of two multistage telescopic cylinders placed upright on the top surface, each multistage telescopic cylinder having at least a first stage and an intermediate stage, and an optional last stage, each stage having a bottom and a top, a first stage bottom being coupled to the top surface and a last stage top being coupled to the 3D printer. In said first stage, a first stage top of a first multistage telescopic cylinder is connected to a consecutive stage top of a neighboring multistage telescopic cylinder by a first extendable diagonal. In said intermediate stage, an intermediate stage top of the first multistage telescopic cylinder is connected to a consecutive stage top of the neighboring multistage telescopic cylinder by an intermediate extendable diagonal. The intermediate stage may comprise several stages, as shown, for example, in FIG. 8. Optionally, after the one or more intermediate stages, in a last stage, a last stage top of each multistage telescopic cylinder is instead connected to the 3D printer, wherein no diagonals lie along the last stage.

BRIEF DESCRIPTION OF DRAWINGS

The present invention will now be discussed in further detail below with reference to the accompanying figures, in which:

FIGS. 9A-9D show varying views of an extendable diagonal. FIG. 9A shows a side view of an extendable diagonal. FIG. 9B shows a top view of an extendable diagonal. FIG. 9C shows a perspective view of an extendable diagonal. FIG. 9D shows an end view of an extendable diagonal.

FIGS. 10A-10C show different views of a lift mechanism with three multistage telescopic cylinders on the base. FIG. 10A shows a side view of a lift mechanism with three multistage cylinders. FIG. 10B shows a top view of a lift mechanism with three multistage cylinders. FIG. 10C shows a perspective view of a lift mechanism with three multistage cylinders.

FIG. 11A shows a lift mechanism in a fully extended form. FIG. 11B shows the lift mechanism in a fully collapsed form.

FIG. 12A shows a side view. FIG. 12B shows a top view.

DETAILED DESCRIPTION OF THE PREFERRED EMBODIMENTS

Figure 1:
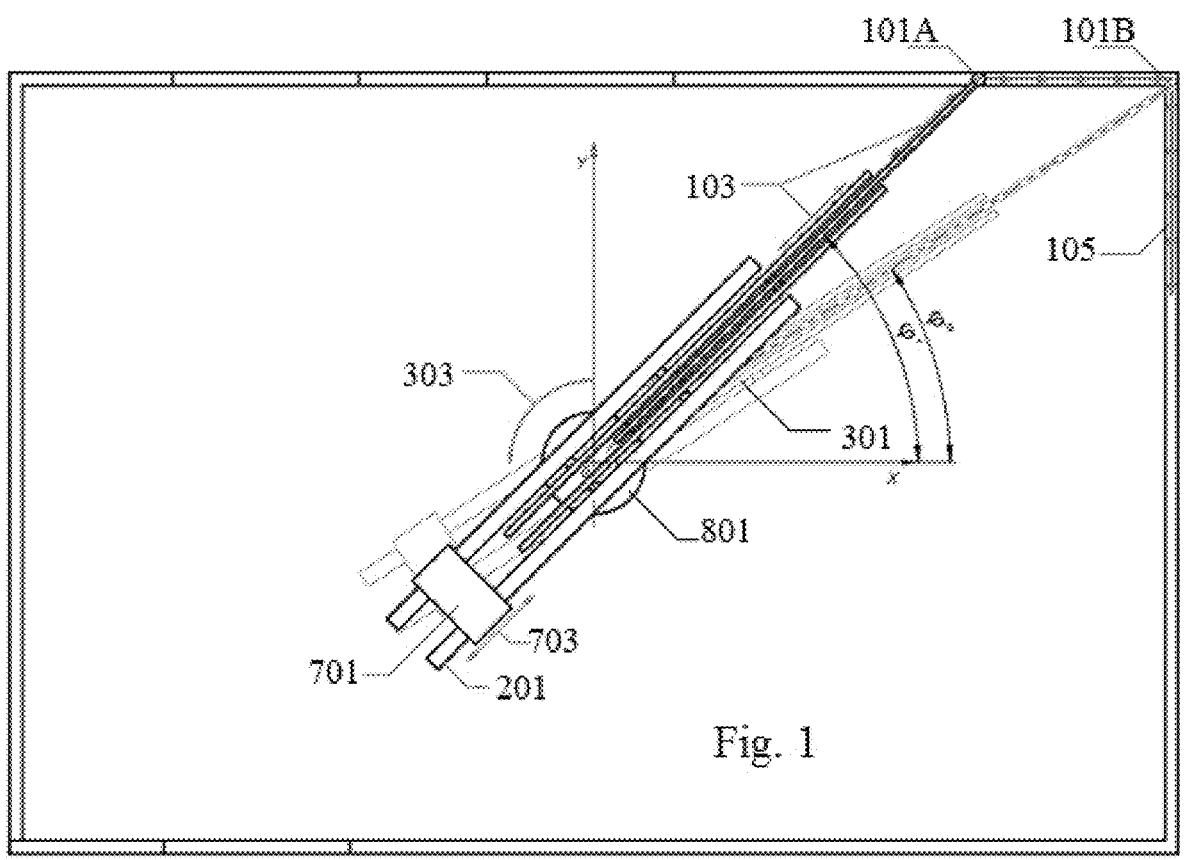
FIG. 1 shows operation of the 3D printer in the X and Y plane.

The invention is different from 3D printers for printing portal-type homes because the device is located in the center of the work zone (starting coordinate, 0) and carries out rotational 303 and translational 103 motions in the XOY plane, resulting in extruder 101A, 101B movement along the specified trajectory 105. Thus, during transformation of the construction from position 201 to position 301, the extruder travels the path from point 101A to point 101B, extruder travel is entered in a polar coordinate system, wherein projection of extruder 101A, 101B position onto the XOY plane is determined by its distance from the axis of rotation (starting coordinate, 0) with the angle of its radius-vector to abscissa ($\varphi'$, $\varphi''$).

The invention also differs from 3D printers with a manipulator-type arm due to the extendable boom arm of the device consisting of a telescoping mechanism, but the device does not consist of segments, each of which is connected with the next segment by a joint, relative to which the motion of these segments is carried out.

In addition to the translational and rotational motion in the XOY plane, the device may carry out translational motions along the Z axis during the printing process, as a result of which the extruder can be raised and lowered, taking up different vertical positions. The height of the extruder is determined in the XOZ plane by its applicate (its coordinate on the Z axis), or by the distance from it to the XOY plane in space.

The given design allows printing a construction, encompassing the surroundings out to a radius of 20 meters, with a center at the point where the coordinates start.

The rotation mechanism is located where the extendable boom arm meets a lift mechanism, so that during the printing process only the extendable boom arm and nodes touching it rotate. The telescoping-type lift mechanism does not rotate, it is a base of the construction, or the telescoping-type lift mechanism can be placed on a base, wherein the base is a separate part of the structure.

The device does not need its base to be anchored to a support, since it includes a counterweight mechanism, which corrects the overall center of mass during extendable boom arm movements such that it coincides with the axis of rotation. This correction is performed by the movement of the load of the counterweight mechanism in the specified direction.

A rotation mechanism 801A is located at the junction of the extendable boom arm and printer lift node, providing the following in addition to its primary function:

1. Transmitting the electrical signal from control node to the motors;
2. Feeding the solution from the plastering station to the extruder; and
3. Transmitting miscellaneous communications from the base to the rotating part.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—the extruder has a special rotary trowel device, which provides a high quality printing surface, and which does not require additional cleaning. In addition to this, the design of the extruder is such that it can change the direction of the nozzle, which allows it to print not only straight, but also curved and/or spherical sections.

The rotation mechanism may be located at the base of the whole construction, wherein during the printing process, the extendable boom arm and all nodes touching it (counterweight mechanism, extruder, etc.) rotate, as does the lift mechanism, presented in the form of a truss.

The device does not need its base to be anchored to a support, since it includes a counterweight mechanism, which corrects the overall center of mass during extendable boom arm movements such that it coincides with the axis of rotation. This correction is performed by the movement of the load of the counterweight mechanism in the specified direction.

The lift mechanism consists of a truss, mounted on the rotation mechanism. An extendable boom arm and all nodes touching it (counterweight mechanism, extruder, etc.) perform necessary movements along this truss. Special mounts on the end of the truss allow building up of the truss, as a result of which it is possible to print second and subsequent floors of a building, the quantity of which depends on device dimensions.

FIG. 1 shows the 3D printer in operation as in the X and Y plane. The 3D printer is configured to automatically build a structure for which it has been given design schematics. The 3D printer has a rotation mechanism 801A. Mounted to the rotation mechanism 801A is an extendable boom arm 201 with telescoping extendable sections 301. The extendable boom arm 201 with extendable sections 301 are only capable of translational motion 103 extending and contracting the reach. The extendable sections 301 are not like segments of a robotic arm wherein the sections have full independent movement relative to one another. The center of rotation mechanism 801A is located at a point 0, 0 of an X and Y coordinate system. At the end of the extendable sections 301 there is an extruder 1401 (See FIGS. 2, 4, and 5) which moves from point 101A to point 101B during deposition of a concrete-based chemical solution.

The 3D printer is located in the center of the work zone (starting coordinate, 0) and carries out rotational 303 and translational 103 motions in an XOY plane, resulting in extruder 1401 moving along points 101A and 101B while completing a specified trajectory 105. Thus, during transformation of the construction from one position to another position, the extruder 1401 travels the path from point 101A to point 101B, and extruder travel is entered in a polar coordinate system, wherein projection of extruder 1401 position onto the XOY plane is determined by its distance from the axis of rotation (starting coordinate, 0) with angle of its radius-vector to abscissa, ϕ' to ϕ".

Embodiment 1

Figure 2:
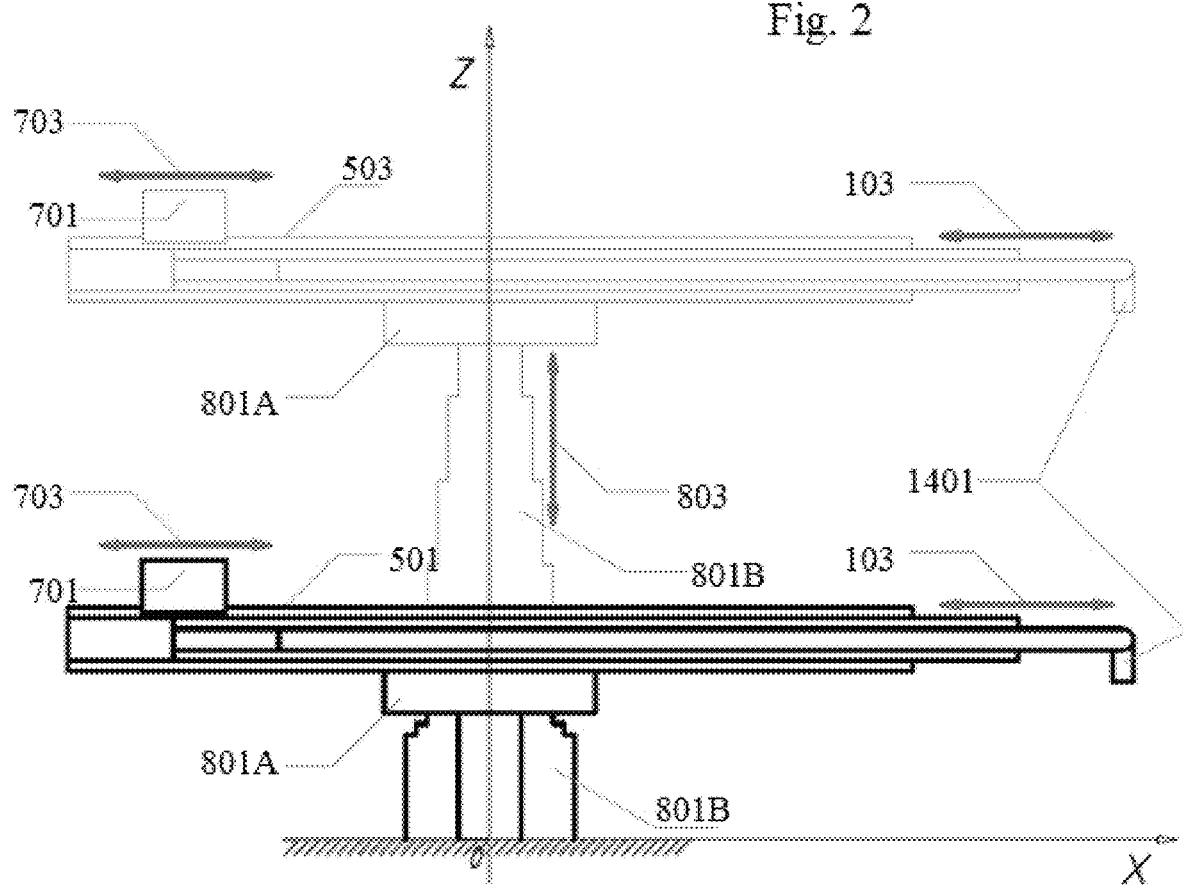
FIG. 2 shows operation of the 3D printer in the X and Z plane.

Referring to FIG. 1 and FIG. 2, in addition to the translational 103 and rotational 303 motion in the XOY plane, the device carries out translational motions 803 along the Z axis during the printing process. As a result, the extruder 1401 can be raised and lowered, taking up positions at 501 or 503, respectively. The height of the extruder 1401 is determined in the XOZ plane by its applicate (its coordinate on the Z axis), or by the distance from it to the XOY plane in space.

In a preferred embodiment, the design allows printing a construction, encompassing the surroundings out to a radius of 20 meters, with a center at the point where coordinates start. In alternative embodiments, the radius is greater than 20 meters.

In this embodiment the rotation mechanism 801A is located between extendable boom arm 201 with telescoping extendable sections 301 with extruder 1401 and telescoping-type lift mechanism 801B, so that during the printing process only the extendable boom arm and nodes touching it rotate. The telescoping-type lift mechanism 801B does not rotate; it is the base of 3D printer.

The 3D printer does not need its base to be anchored to a support, since it includes a counterweight mechanism 701, which corrects the overall center of mass during extendable boom arm movements 103 such that it coincides with the axis of rotation Z. This correction is performed by the movement of the load of the counterweight mechanism 701 in the specified direction 703.

Rotation mechanism 801A is located at the junction of the extendable boom arm 201 with telescoping extendable sections 301 and a printer lift node, the telescoping-type lift mechanism 801B, providing the following in addition to its primary function:
1. Transmitting the electrical signal from control node to the motors;
2. Feeding a dry mixture into a combination concrete mixture and pump 2101 (FIG. 5) to the extruder 1401; and
3. Transmitting miscellaneous communications from the base to the rotating extendable boom arm 201.

Feeding of the solution is implemented using a rotary connector, and in the connector assembly, using sliding contacts—graphite brushes and brass whiskers slide along gold-plated rings, which allows rotation of the turning part in any direction an unlimited number of times.

On the print head—extruder 1401 has a special rotary trowel device (not shown), which provides high quality printing surface, which does not need additional cleaning. In addition to this, the design of the extruder is such that it can change the direction of the nozzle, which allows it to print not only straight, but also curved and/or spherical sections.

Embodiment 2

Figure 3:
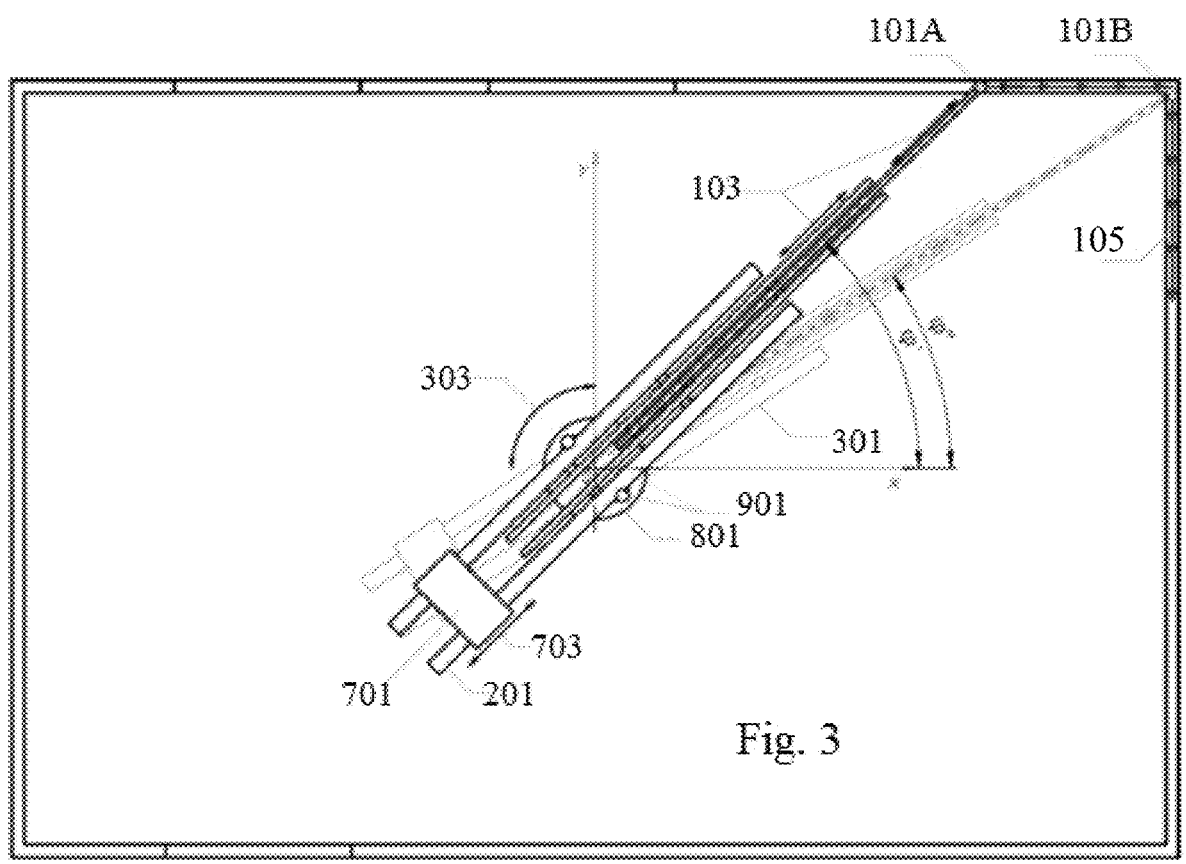
FIG. 3 shows operation of the 3D printer in the X and Y plane.
Figure 4:
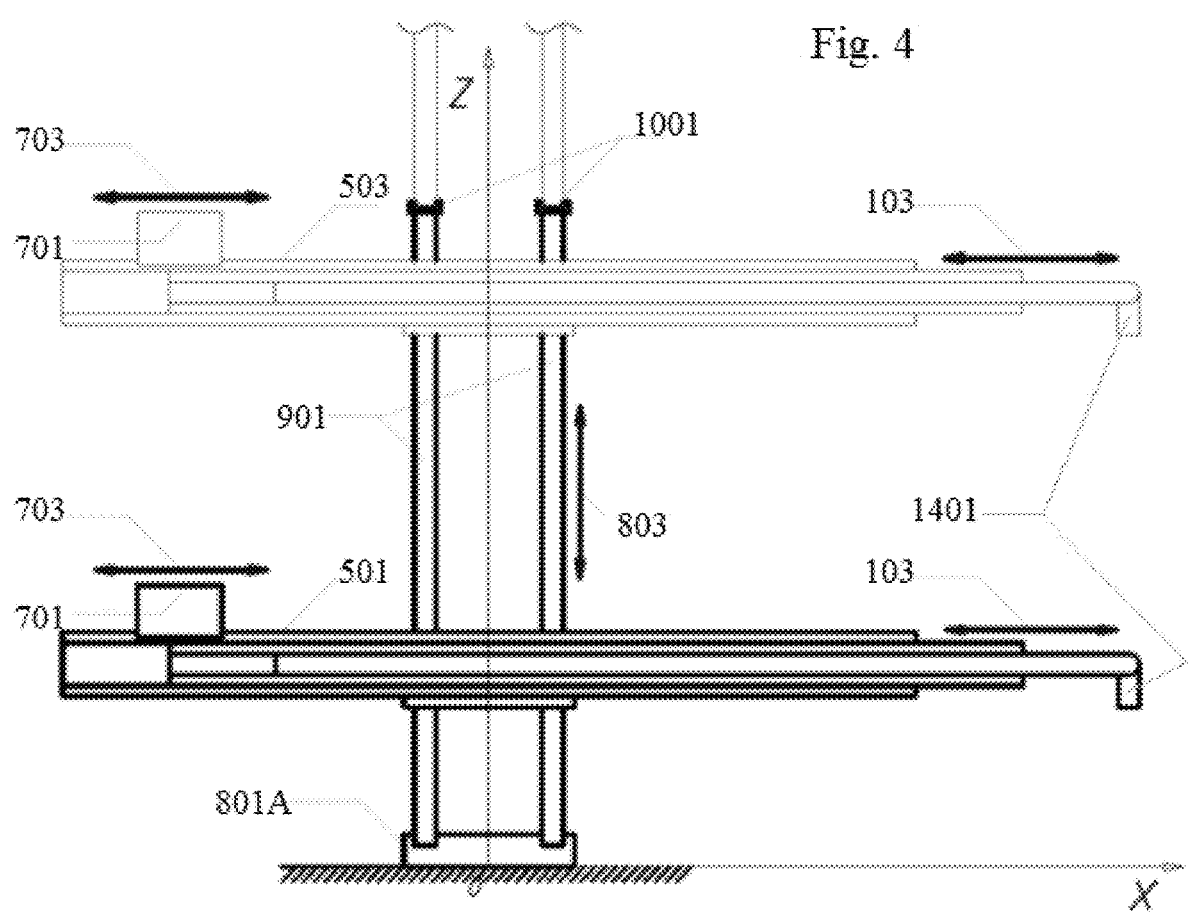
FIG. 4 shows operation of an alternative embodiment of the 3D printer in the X and Z plane.

Referring to FIG. 3 and FIG. 4, in addition to the translational 103 and rotational 303 motion in the X and Y plane, the device carries out translational motions 803 along the Z axis during the printing process, as a result of which the extruder 1401 can be raised and lowered, taking up positions at 501 or 503, respectively. The height of the extruder 1401 is determined in the XOZ plane by its applicate (its coordinate on the Z axis), or by the distance from it to the XOY plane in space. In a preferred embodiment the design allows printing a construction, encompassing the surroundings out to a radius of 20 meters, with a center at the point where coordinates start. In alternative embodiments, the radius is greater than 20 meters.

The rotation mechanism 801A is located in the base of the whole construction, the 3D printer, wherein during the printing process, the extendable boom arm 201 with telescoping extendable sections 301 and all nodes connected to it (counterweight mechanism 701, extruder 1401, etc.) rotate, as does the lift mechanism 901, presented in the form of a truss.

The device does not need its base to be anchored to a support, since it includes a counterweight mechanism 701, which corrects the overall center of mass during extendable boom arm movements 103 such that it coincides with the axis of rotation Z. This correction is performed by the movement of the load of the counterweight mechanism 701 in the specified direction 703.

Rotation mechanism 801A is located in the base of the construction, the 3D printer, providing the same functions as noted in Embodiment 1.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—extruder 1401 has a special rotary trowel device (not shown), which provides high quality printing surface, which does not need additional cleaning. In addition to this, the design of the extruder is such that it can change the direction of the nozzle, which allows it to print not only straight, but also curved and/or spherical sections.

The lift mechanism consists of truss 901, mounted on the rotation mechanism 801A. The extendable boom arm 201 with telescoping extendable sections 301 and all nodes touching it (counterweight mechanism 701, extruder 1401, etc.) perform necessary movements 803 along this truss 901. Special mounts 1001 on the end of the truss 901 allow building up of the truss, as a result of which it is possible to print second and subsequent floors of a building, the quantity of which depends on device dimensions.

Figure 5:
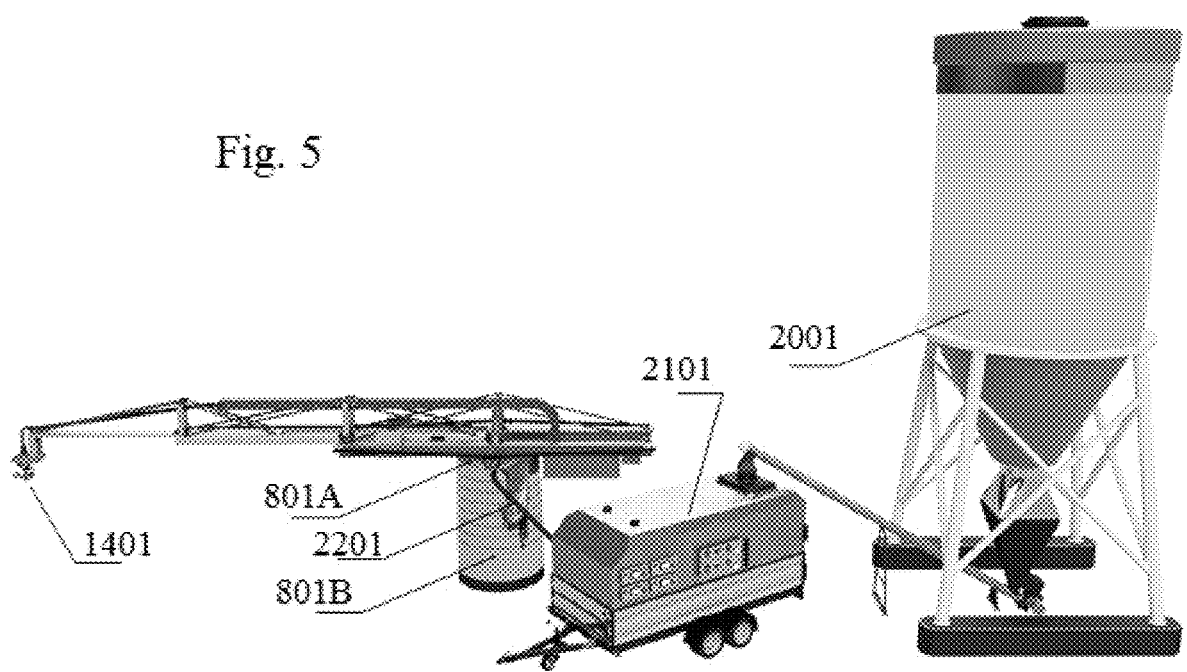
FIG. 5 shows the 3D printer system as a whole.
Figure 6:
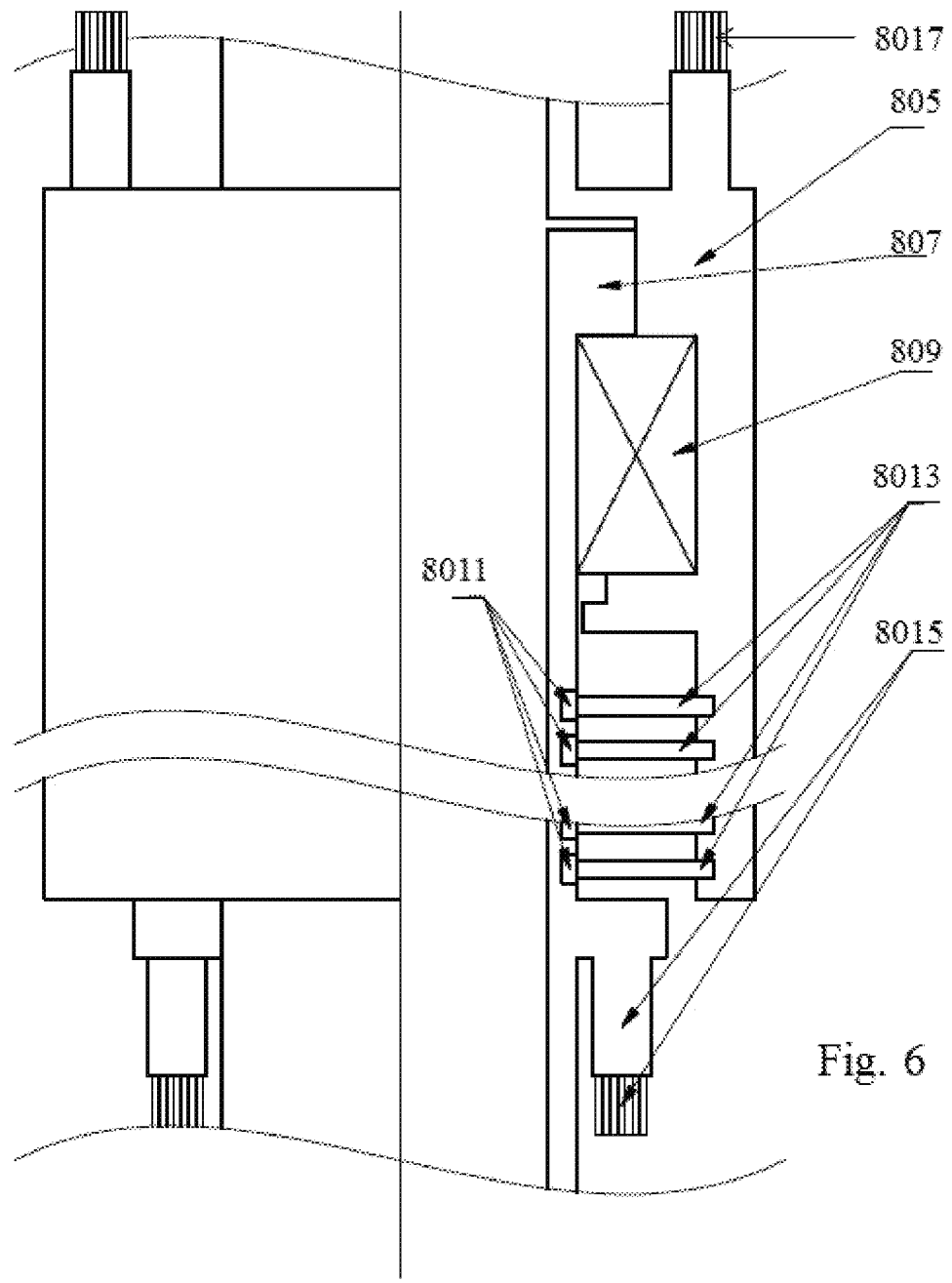
FIG. 6 shows additional details of the rotation mechanism.
Figure 7:
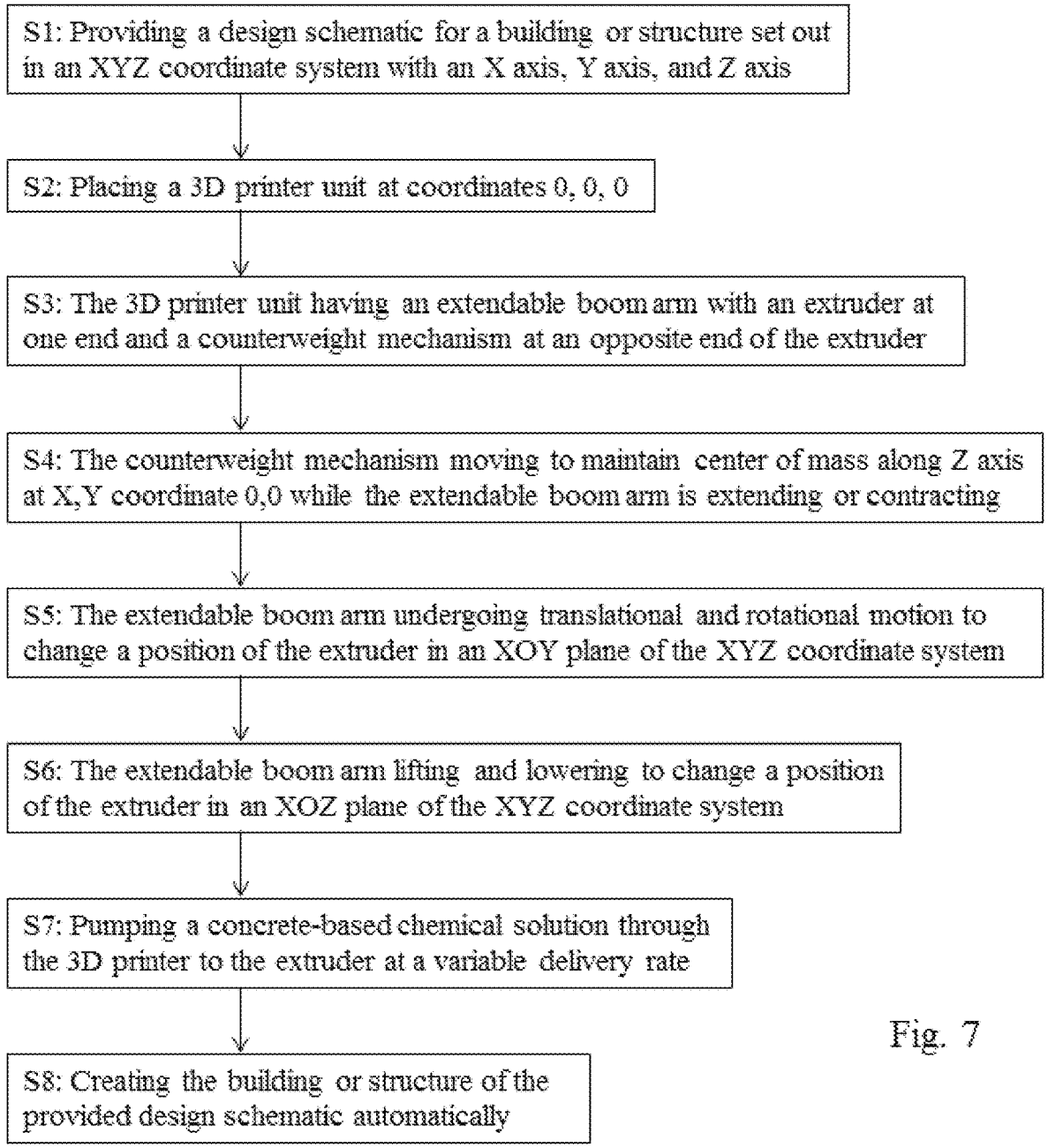
FIG. 7 shows a flow chart of a method of operating the 3D printer.

Referring to FIG. 5, and regarding both Embodiments 1 and 2: Rotation mechanism 801A is connected to combination concrete mixer and pump 2101 by connection hose or pipe 2201. Combination concrete mixer and pump 2101 contains pump control systems to change the pressure and flow rate of the concrete-based chemical solution. Combination concrete mixer and pump 2101 is connected to dry mixture supply 2001. The dry mixture supply 2001 can be a storage unit (as shown) or could be a transport truck that pours its content into a trough or other feeding unit for combination concrete mixer and pump 2101. Dry concrete-based chemical is stored in the dry mixture supply 2001 which is then brought into the combination concrete mixer and pump 2101 where the dry concrete-based chemical is mixed with a predetermined proportion of water to form the concrete-based chemical solution and then pumped by the combination concrete mixer and pump 2101 through the 3D printer to the extruder 1401.

The concrete-based chemical solution is under an operational pressure of 40 bars into a special hose for abrasive materials (such as concrete) 2201. Supply combination concrete mixer and pump 2101 is either gerotor or piston type. Combination concrete mixer and pump 2101 is synchronized with the 3D printer and provides solution both fast and precise, regulating supply volume from 0 to 120 liters per minute. Extruder 1401 does not move with a constant trajectory speed; it slows down on corners when it changes movement direction to avoid vibrations. Thus, when the extrusion head slows down or speeds up, the concrete-based chemical solution supply volume varies in accordance with software control.

The control unit for the 3D printer and combination concrete mixer and pump 2101 can be housed in the base of the 3D printer (801B embodiment 1, 801A embodiment 2), and the extendable boom arm 201, in an ancillary unit such as the combination concrete mixer and pump 2101, or in another ancillary control unit (not shown).

Embodiment 3

In addition to any of the embodiments described herein, operation of the 3D printer is carried out according to the following method: Step 1: providing a given design schematic for the building or structure set out in an XYZ coordinate system with an X axis, Y axis, and Z axis. Step 2: placing a 3D printer unit at coordinates 0, 0, 0. Step 3: the 3D printer unit having an extendable boom arm with an extruder at one end and a counterweight mechanism at an opposite end of the extruder. Step 4: the counterweight mechanism moving to maintain center of mass along Z axis at X, Y coordinate 0, 0 while the extendable boom arm is extending or contracting. Step 5: the extendable boom arm undergoing translational and rotational motion to change a position of the extruder in an XOY plane of the XYZ coordinate system. Step 6: the extendable boom arm lifting and lowering to change a position of the extruder in an XOZ plane of the XYZ coordinate system. Step 7: pumping a concrete-based chemical solution through the 3D printer to the extruder at a variable delivery rate. Step 8: creating the building or structure of the provided design schematic automatically.

Embodiment 4

Figure 8:
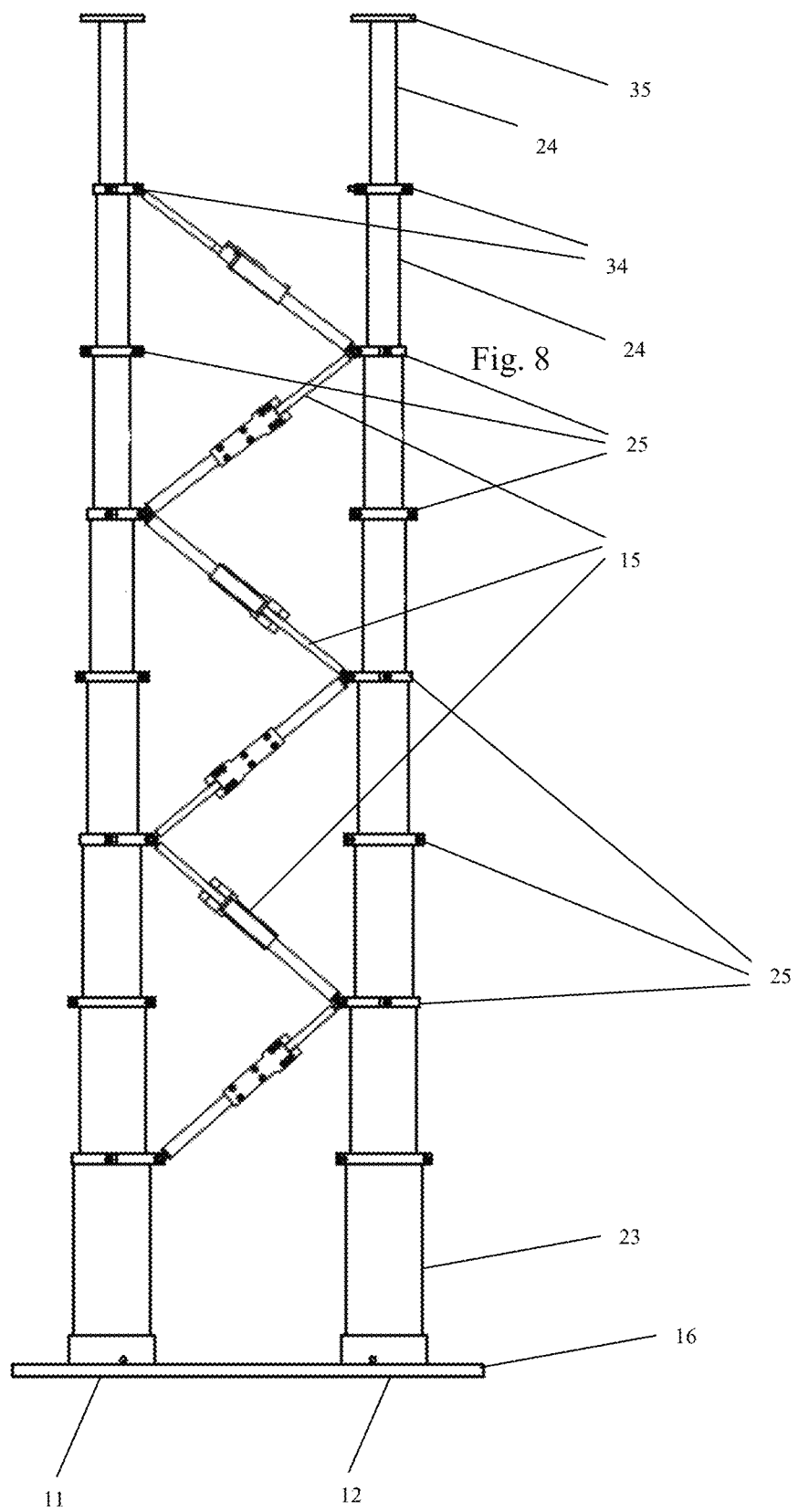
FIG. 8 shows a lift mechanism with two multistage telescopic cylinders on a base.

Another embodiment of the device for automatically printing buildings and structures comprises a telescoping-type lift mechanism with two multistage telescopic cylinders. The lift mechanism is placed on a top surface of a base to support a 3D printer. The lift mechanism is powered, for example, hydraulically, though other options known to those skilled in the art can be used to power the lift mechanism. FIG. 8 shows first 11 and second 12 multistage telescopic cylinders placed upright on the top surface of the base 16. The first and the second multistage telescopic cylinders each has at least two stages with a bottom portion of a first stage 23 coupled to the top surface of the base 16. A top portion of a last intermediate stage 34 of the first and second multistage telescopic cylinders 11, 12 supports the 3D printer. Besides the first and the second multistage telescopic cylinders, the lift mechanism includes one or more extendable diagonals 15 located between and connecting the multistage telescopic cylinders at the top portions 25, 34 of the first and second multistage telescopic cylinders. The multistage telescopic cylinders 11, 12 are comprised of individual cylinders which are concentric and which fit inside one another so as to fully extend telescopically and fully collapse when all cylinders are lowered towards the base. Each individual cylinder comprises a top portion 25 and a bottom portion 24. The extendable diagonals 15 connect top portions of individual cylinders of neighboring multistage telescopic cylinders in stages. The first (i.e. most bottom) stage of each telescopic cylinder comprises a top portion 25 which is connected to one end of an extendable diagonal 15. The other end of the same extendable diagonal 15 is connected to a top portion 25 of a second (i.e. consecutive) stage of the second telescopic cylinder. A second extendable diagonal 15 connects a second stage top 25 of one telescopic cylinder to a third (i.e. consecutive) stage top 25 of the other telescopic cylinder. A third extendable diagonal 15 connects a third stage stop of one telescopic cylinder to a fourth (i.e. consecutive) stage top 25 of the other telescopic cylinder, and so on, as shown in FIG. 8. The final/upper diagonal connects to the last intermediate stage top of the highest cylinder of one multistage telescopic cylinder. It is noted that FIG. 8 shows one embodiment, while another embodiment may comprise diagonals which are parallel rather than connected at the same top of a particular stage cylinder. It is further noted that FIG. 8 shows an embodiment further comprising a last stage which does not comprise diagonals, which is optional, and which comprises a bottom portion 25 and a last stage top portion 35. Additionally, each diagonal 15 has an ability to lock in place and unlock via a locking mechanism.

In other words, one embodiment of the device for automatically printing buildings and structures comprises: a base having a top surface, a lift mechanism coupled to the base on the top surface, a 3D printer supported by the lift mechanism, the lift mechanism including a sequence of two multistage telescopic cylinders placed upright on the top surface, each multistage telescopic cylinder having at least a first stage and an intermediate stage, and an optional last stage, each stage having a bottom and a top, a first stage bottom being coupled to the top surface and a last stage top being coupled to the 3D printer. In said first stage, a first stage top of a first multistage telescopic cylinder is connected to a consecutive stage top of a neighboring multistage telescopic cylinder by a first extendable diagonal. In said intermediate stage, an intermediate stage top of the first multistage telescopic cylinder is connected to a consecutive stage top of the neighboring multistage telescopic cylinder by an intermediate extendable diagonal. The intermediate stage may comprise several stages, as shown, for example, in FIG. 8. Optionally, after the one or more intermediate stages, in a last stage, a last stage top of each multistage telescopic cylinder is instead connected to the 3D printer, wherein no diagonals lie along the last stage.

Embodiment 5

Another embodiment of the device for automatically printing buildings and structures comprises a telescoping-type lift mechanism with at least three multistage telescopic cylinders 11, 12, 13 (also referred to herein as telescopic legs). The lift mechanism is placed on a base 16 to support a 3D printer. A sequence of at least three multistage telescopic cylinders 11, 12, 13 is placed upright along a closed curve on a top surface 14 of the base 16. Regarding each of the at least three multistage telescopic cylinders 11, 12, 13, each has at least two stages, and optionally at least three stages, with a bottom portion of a first stage coupled to the top surface 14 of the base 16, and a top portion of a last intermediate stage supporting the 3D printer (in embodiments with a last stage, the last stage top instead supports the 3D printer). The telescoping-type lift mechanism with at least three multistage telescopic cylinders also includes at least two stages of pluralities of extendable diagonals 15.

Figure 11A:
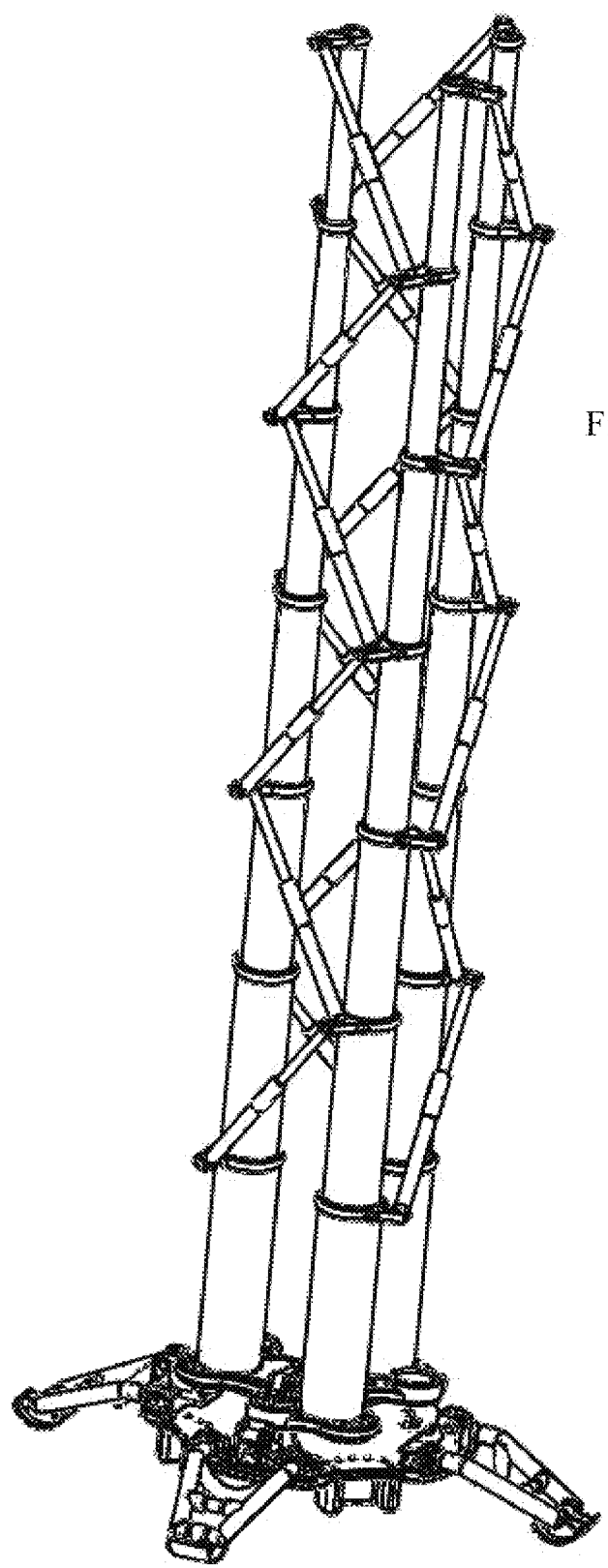
FIGS. 11A-11B show another embodiment of a lift mechanism with three multistage telescopic cylinders on the base.
Figure 11B:
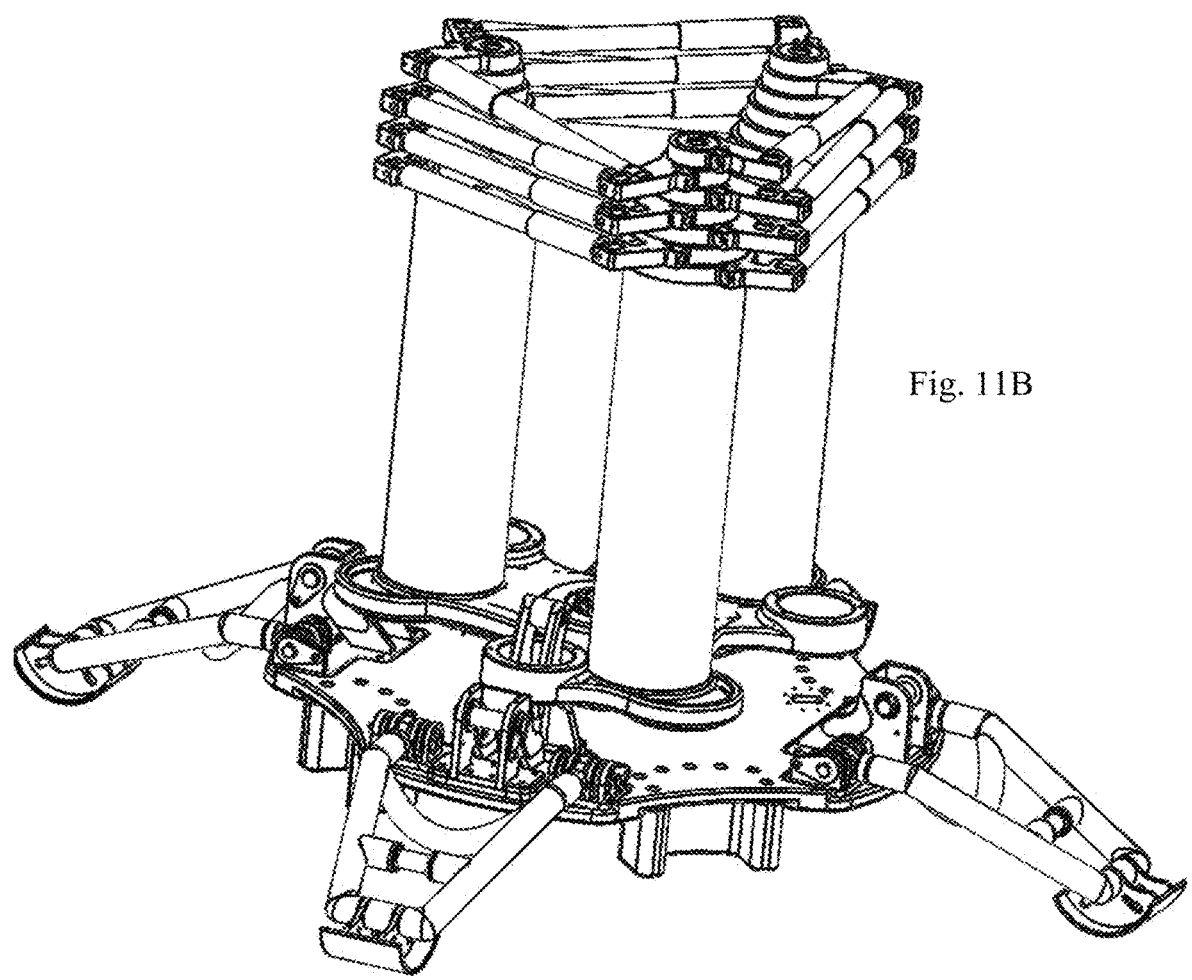

In a preferred embodiment, as shown in FIGS. 10A-10C, the lift mechanism includes a sequence of at least three multistage telescopic cylinders (legs) 11, 12, 13 placed upright along a closed curve 17 on the top surface 14, each multistage telescopic cylinder having at least a first stage 100 and an intermediate stage 200, and an optional last stage 300, depending on the particular design. Each stage comprises an individual cylinder having a bottom portion 24 and a top portion 25, a first stage bottom 23 being coupled to the top surface 14 and a last stage top 35 being coupled to the 3D printer. In said first stage 100, a first stage top 25 of each multistage telescopic cylinder 11, 12, 13 is connected to a consecutive stage top of a neighboring multistage telescopic cylinder by a set of first extendable diagonals 15, wherein each first extendable diagonal connects at a different top of the first stage 100, said first extendable diagonals forming a first plurality of extendable diagonals lying along a first level of a column formed from the closed curve 17 of the top surface 14. This first level plurality of diagonals would be along the lowest portion of the telescopic legs having diagonals, closest to the base. It is noted that the first stage 100 of the lifting mechanism does not comprise any extendable diagonals. In said intermediate stage 200, an intermediate stage top 25 of each multistage telescopic cylinder 11, 12, 13 is connected to a consecutive stage top 25 of a neighboring multistage telescopic cylinder by a set of intermediate extendable diagonals 15, wherein no intermediate extendable diagonal connects at a same top along one given level of the closed curve of the top surface, said intermediate extendable diagonals forming a second plurality of extendable diagonals lying along an intermediate level of the closed curve of the top surface. The intermediate stage may comprise several stages 21, as shown, for example, in FIGS. 10A-10C and FIG. 11A. Finally, in an optional last stage 300, a last stage top 35 of each multistage telescopic cylinder is connected to the 3D printer, the last stage comprising a level without any extendable diagonals. This last level would be the uppermost level of each telescopic leg. Thus, in this embodiment, each intermediate stage level of the lift mechanism comprises three diagonals which connect neighboring telescopic legs along one direction while allowing the mechanism to fully expand and collapse and also allowing the diagonals to extend and collapse fully, as shown, for example, in FIGS. 11A-11B. In another embodiment, as that shown in FIGS. 10A and 10C, the last stage is included which, similar to the first stage level, does not comprise diagonals. It is noted that if the final stage is omitted from the design, the final intermediate stage top 34 would then be coupled to the 3D printer.

Embodiment 6

Figure 12A:
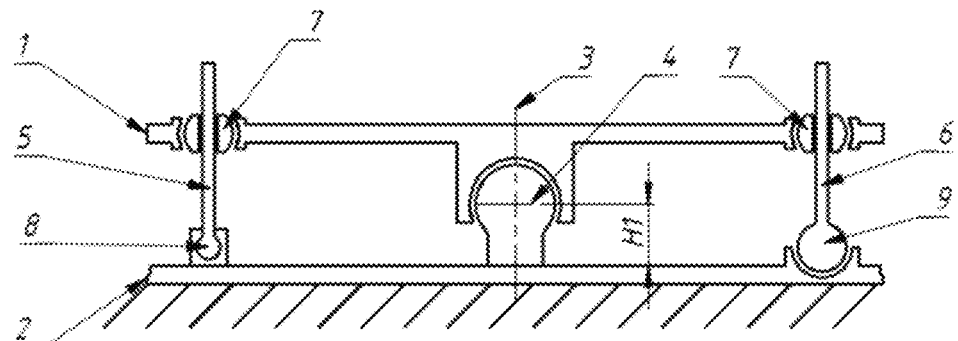
FIGS. 12A-12B show an embodiment of the base of the device for printing buildings and structures.
Figure 12B:
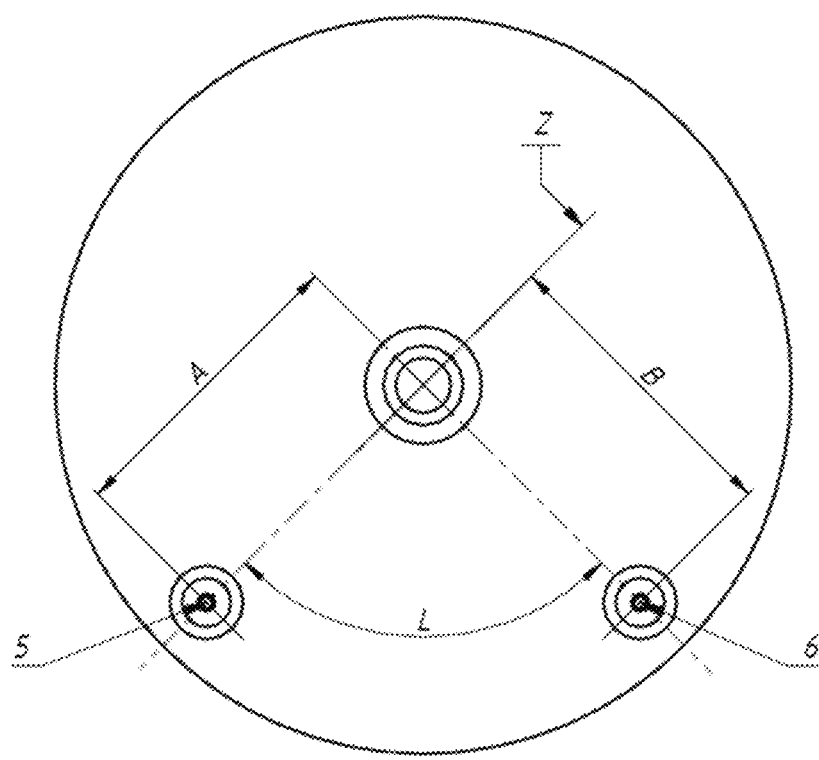

Yet another embodiment of the device for automatically printing buildings and structures comprises a telescoping-type lift mechanism with the lift mechanism placed on a top surface of a base. The base has a first plate and a second plate as shown in FIGS. 12A-12B. The second plate is overlaying the first plate. The lift mechanism is mounted on the top surface of the second plate. There is a ball joint between the first plate and the second plate. The ball joint allows the second plate of the base to tilt in respect to the first plate. The base also has at least two supports between the first and the second plate. These supports are coupled to the second plate by hinge joints. As can be seen in FIGS. 12A-12B, a first support is coupled to the first plate with a pin. A second support is coupled to the first plate by a mechanism, operating on principles of exterior automotive CV joints, or different variations of ball joints. The supports' location, relative to the first and second plates, can be different (distances from the center and angles). One possible location of the supports is illustrated in FIG. 12B.

Figure 13:
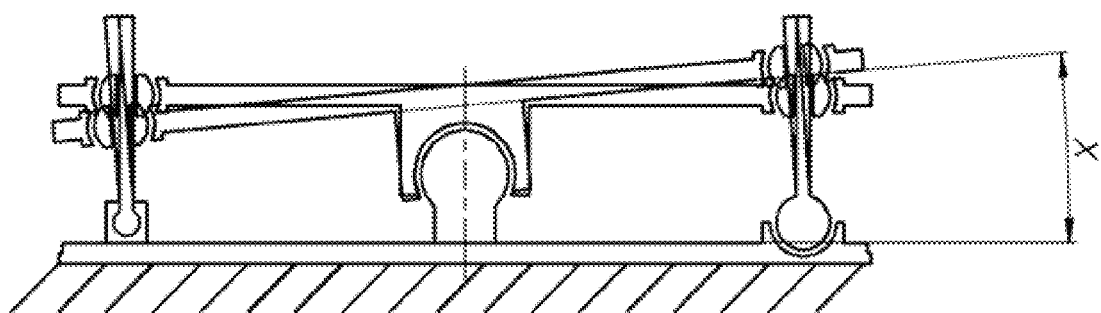
FIG. 13 shows a cross-sectional view of the base when a base actuator is engaged.

FIG. 13 shows the second plate tilted in respect to the first plate. Depending on conditions of operation and a required tilt angle, a rotation protection may be required in the structure of the base.

Figure 14:
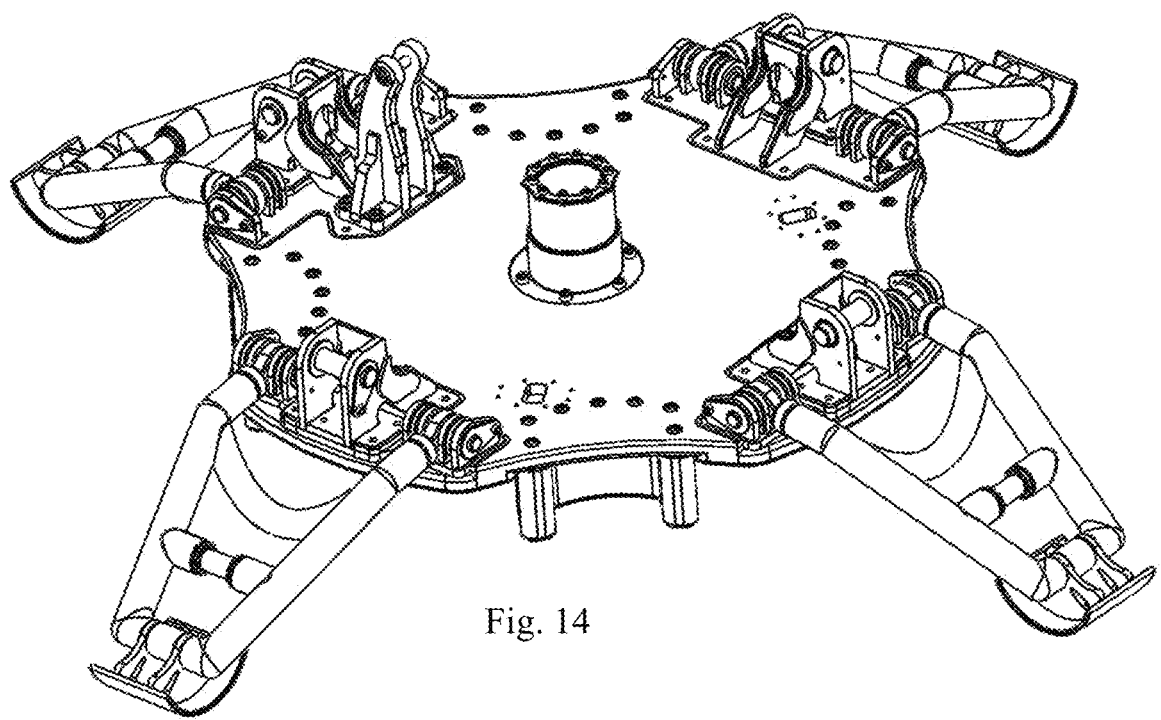
FIG. 14 shows another embodiment of the base.

FIG. 14 shows another embodiment of the base of the device for automatically printing buildings and structures. The base can also include a base actuator to power the ball joint and the supports to facilitate tilting the second plate in respect to the first plate. The base actuator can be implemented with screw jacks, a pneumatic/hydraulic mechanism, and other known methods in the art.

Rotation Mechanism:

The rotation mechanism 801A has an outer housing 805 and an inner housing 807 with a bearing unit 809 between outer housing 805 and inner housing 807. The inner housing 807 and outer housing 805 both surround the concrete based chemical solution feed pipe (not shown). Mounted to the inner case are contactor rings 8011. The contactor rings 8011 are in electrically conductive contact with contactor antennae 8013 that extend from outer housing 805. The contactor rings 8011 and contactor antennae 8013 allow for power and operational commands for the 3D printer to be transmitted. The inner housing end 8015 is where power and control signals are provided to the 3D printer as a whole. The power and control signals pass through the inner case end which is electrically connected to the contactor rings 8011 and then to the contactor antennae 8013 which is electrically connected to outer housing end 8017.

Bearing unit 809 is in direct contact with the concrete based chemical solution feed pipe (not shown) and provides the bearings that give outer housing 805 and inner housing 807 the ability to rotate around the concrete based chemical solution feed pipe. The concrete based chemical solution feed pipe connects to connection hose or pipe 2201.

The device allows for the transmission of fluid through a sealed pipe while rotating the outer housing 805 and the inner housing 807 in different directions with respect to a single axis and ensures the transfer of the electrical signal during operation from the base of the 3D printer to the top of the 3D printer through the rotation mechanism 801A through the contactor rings 8011 and contactor antennae 8013.

The pipe through which flows a liquid (mixture) is formed by two bodies—the outer housing 805 and inner housing 807, which rotate freely relative to each other. The ability to rotate freely relative to each other is provided by the bearing unit 809. The electrical signal is transmitted from one part to another by sliding contacts. On the inner housing 807 is located a contactor ring 8011 which connects to contactor antennae 8013. Contactor antennae 8013 are mounted in the outer housing 805. From contactor rings 8011 an electrical signal is fed through the inner housing 807 at the inner housing end 8015. From contactor antennae 8013 a signal is fed through the outer housing 805 to another outer housing end 8017. The contactor rings 8011 encircle the inner housing 807.

Transfer of the liquid and signals is thereby available in rotation in one enclosure, in different directions, and in a static position. Location of the rings and the contactor antennae may be both as in the description above, and vice versa (i.e., contactor ring 8011 arranged in the outer housing 805, and the contactor antennae 8013 being located in the inner housing 807) in an alternative embodiment of the invention. The contactor rings 2011 are mounted to non-conductive inserts (not shown) and are not in direct electrical contact with the inner housing 807. The contactor antennae 8013 are mounted to non-conductive inserts (not shown) and are not in direct electrical contact with the outer housing 805.

Contactor antennae 8013 extend from the outer housing 805 to the contactor rings 8011 on the inner housing 807, acting as electrical contact brushes and allowing for electrical signals and power to be transferred from the contactor rings 8011 to the contactor antennae 8013, much like power is transferred in an electrical motor using brushes.

The Extendable Diagonals, and Pluralities Thereof:

The plurality of extendable diagonals provides additional structure, support, and stiffness to the lift mechanism of any of the above described embodiments. FIGS. 9A-9D show an example of an extendable diagonal having two sections: a hollow tube 91 and a rod 92 that runs inside the tube. The rod 92 moves coaxially in relation to the hollow tube 91 facilitated by a bearing (e.g., a linear bearing) installed in an enclosure or housing 94. The enclosure or housing 94 also comprises a locking mechanism 95 (e.g. but not limited to a pneumatic stopper), which can be operated by a controller. When the locking mechanism 95 of the extendable diagonal is activated, the rod 92 is immobilized in respect to the tube 91. Two remote ends of the extendable diagonal provide ball couplings 93. The ball couplings 93 of the extendable diagonals are used to rotatably connect top portions of different stage cylinders of the telescopic cylinders as shown, for example, in FIGS. 8, 10, and 11.

For example, a set of diagonals is mounted on the lifting mechanism, consisting of three telescopic hydraulic cylinders 11, 12, 13. The hydraulic cylinders are installed on a platform, equidistant from the center of the platform and from each other. The diagonals are mounted symmetrically between section N and (N+1) section of an adjacent cylinders. Thus, each of the diagonals in the assembly connects two respective rods (i.e., individual columns) of adjacent hydraulic cylinders. When a stopper (i.e., locking mechanism) is engaged, each hydraulic cylinder rod gets hard fixed by means of two diagonals on the relevant rods of the other two hydraulic cylinders.

Additional Embodiments

Further embodiments of the present invention include but are not limited to the following:

The device of the present invention, wherein each extendable diagonal has a locking mechanism, the locking mechanism immobilizing the diagonal when said locking mechanism is enabled, thus immobilizing the lift mechanism until said locking mechanism is disabled. In this manner, the locking mechanism(s) may be enabled and disabled as the 3D printer is raised and lowered according to the specific instructions of a particular building structure. The locking mechanisms allow for additional structure and stability while the lift mechanism is stationary.

The device for automatically printing buildings and structures as disclosed herein, wherein the 3D printer is a 3D printer configured in polar coordinates.

The device for automatically printing buildings and structures as disclosed herein, the 3D printer further including: a rotation mechanism coupled to the lift mechanism; an extendable boom arm having a first end, the first end of the extendable boom arm is coupled to the rotation mechanism, the extendable boom arm being capable of translational and rotational motion in an X-Y plane; and an extruder coupled to a second end of the extendable boom arm, the extruder extruding a concrete-based chemical solution.

The device for automatically printing buildings and structures as disclosed herein, wherein each extendable diagonal in the first plurality of extendable diagonals and the second plurality of extendable diagonals is a two-stage telescopic cylinder.

The device for automatically printing buildings and structures as disclosed herein, the extendable boom arm having a counterweight mechanism coupled to the first end, a position of the counterweight mechanism is automatically adjusted so a center of mass of the 3D printer coincides with an axis of rotation of the 3D printer.

The device for automatically printing buildings and structures as disclosed herein, the extendable boom arm having a multistage telescopic portion, the extendable boom arm having a maximum operating radius of 20 meters.

The device for automatically printing buildings and structures as disclosed herein, the base further including: a first plate; a second plate overlaying the first plate, the second plate having the top surface; a ball joint between the first plate and the second plate; and at least two supports between the first and the second plate, the at least two supports are coupled to the second plate by hinge joints.

The device for printing automatically buildings and structures as disclosed herein, wherein a first support of the at least two supports is coupled to the first plate with a pin, and a second support of the at least two supports is coupled to the first plate by an exterior automotive joint.

The device for printing automatically buildings and structures as disclosed herein, the base further including a base actuator to power the ball joint and the at least two supports to facilitate tilting the second plate in relation to the first plate.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A device for automatically printing buildings and structures, comprising:
    a base having a top surface,
    a lift mechanism coupled to the base on the top surface,
    a 3D printer supported by the lift mechanism,
        the lift mechanism including a sequence of at least three multistage telescopic cylinders placed upright along a closed curve on the top surface,
        each multistage telescopic cylinder having at least a first stage and an intermediate stage, each stage having a bottom and a top, a first stage bottom being coupled to the top surface and a last intermediate stage top being coupled to the 3D printer,
        the first stage top of each multistage telescopic cylinder is connected to a consecutive stage top of a neighboring multistage telescopic cylinder by a first extendable diagonal such that the first extendable diagonals form a first plurality of extendable diagonals lying along a first level of the closed curve of the top surface,
        the intermediate stage top of each multistage telescopic cylinder is connected to a consecutive stage top of a neighboring multistage telescopic cylinder by an intermediate extendable diagonal such that the intermediate extendable diagonals form a second plurality of extendable diagonals lying along an intermediate level of the closed curve of the top surface, and
    wherein at least one extendable diagonal comprises a locking mechanism, the locking mechanism immobilizing the diagonal when said locking mechanism is enabled, thus immobilizing the lift mechanism until said locking mechanism is disable; further comprising
    a first plate;
    a second plate overlaying the first plate, the second plate having the top surface;
    a ball joint between the first plate and the second plate; and
    at least two supports between the first and the second plate, the at least two supports are coupled to the second plate by hinge joints.

2. The device of claim 1, wherein each extendable diagonal has a locking mechanism, the locking mechanism immobilizing the diagonal when said locking mechanism is enabled, thus immobilizing the lift mechanism until said locking mechanism is disabled.

3. The device of claim 1, wherein the 3D printer is a 3D printer configured in polar coordinates.

4. The device of claim 1, the 3D printer further including:
    a rotation mechanism coupled to the lift mechanism;
    an extendable boom arm having a first end, the first end of the extendable boom arm is coupled to the rotation mechanism, the extendable boom arm being capable of translational and rotational motion in an X-Y plane; and
    an extruder coupled to a second end of the extendable boom arm, the extruder extruding a concrete-based chemical solution.

5. The device of claim 4, the extendable boom arm having a counterweight mechanism coupled to the first end, a position of the counterweight mechanism is automatically adjusted so a center of mass of the 3D printer coincides with an axis of rotation of the 3D printer.

6. The device of claim 4, the extendable boom arm having a multistage telescopic portion, the extendable boom arm having a maximum operating radius of 20 meters.

7. The device of claim 1, wherein each extendable diagonal in the first plurality of extendable diagonals and the second plurality of extendable diagonals is a two-stage telescopic cylinder.

8. The device of claim 1, wherein a first support of the at least two supports is coupled to the first plate with a pin, and a second support of the at least two supports is coupled to the first plate by an exterior automotive joint.

9. The device of claim 1, the base further including a base actuator to power the ball joint and the at least two supports to facilitate tilting the second plate in relation to the first plate.

* * * * *